Jan. 14, 1930.　　　　　E. B. ALLEN　　　　　1,743,511
MECHANICAL MOVEMENT
Filed July 13, 1927
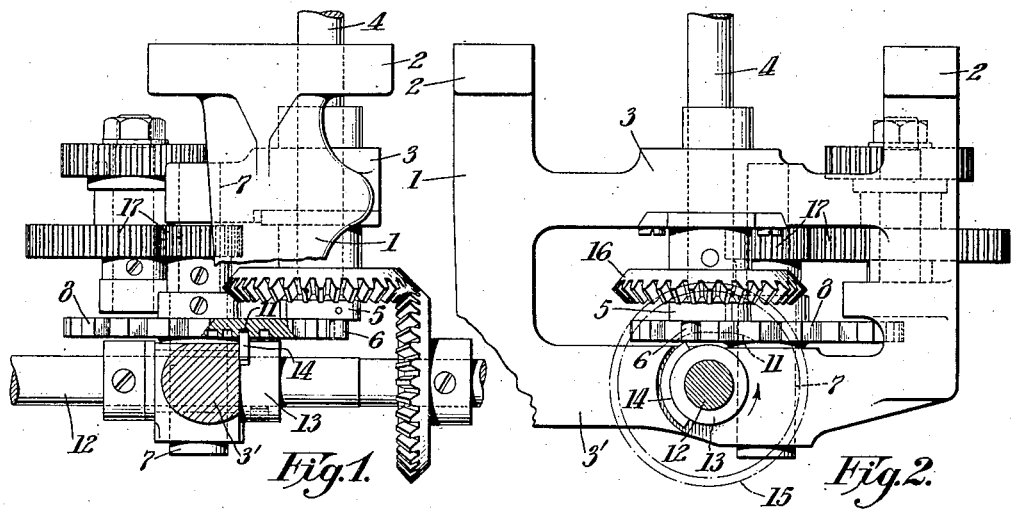
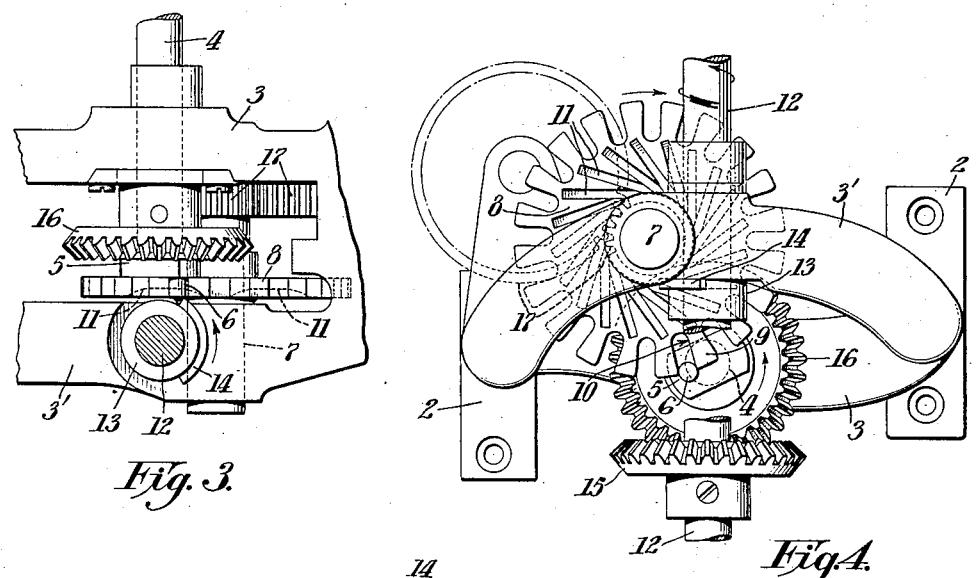
INVENTOR
Edward B. Allen
WITNESSES
BY
Henry J Miller
ATTORNEY Patented Jan. 14, 1930

1,743,511

UNITED STATES PATENT OFFICE

EDWARD B. ALLEN, OF NEWTOWN, CONNECTICUT, ASSIGNOR TO THE SINGER MANUFACTURING COMPANY, OF ELIZABETH, NEW JERSEY, A CORPORATION OF NEW JERSEY

MECHANICAL MOVEMENT

Application filed July 13, 1927. Serial No. 205,294.

This invention has for an object to provide a simple, easily constructed, quiet running and efficient mechanical movement for converting a continuous rotary motion into a step-by-step or intermittent rotary motion with relatively long periods of dwell during which the intermittently rotated part is locked against movement. Further objects of the invention will appear from the following description and claim.

The intermittent drive is secured by providing a star-wheel having a toothed periphery with which meshes a driving-pin on a continuously rotating shaft. For locking the star-wheel while the driving-pin is out of engagement therewith, there is preferably provided a second shaft running with the first shaft, preferably at an angle to the latter, and having a rib and groove connection with one side face of the star-wheel. Preferably, one side face of the star-wheel has milled therein a series of grooves equal to the number of teeth in the star-wheel, such grooves being cut in a zone within the circle of the bases of said teeth; the second shaft extending parallel to and adjacent the milled side face of the star-wheel and carrying a collar having a locking rib timed to enter one of the slots and lock the star-wheel just as the driving-pin is emerging from driving engagement with said wheel. The circumferential extent of the rib is such that its trailing end leaves the groove just as the driving-pin is entering into driving engagement with the star-wheel.

The combination of the pin and star-wheel drive with the rib and groove locking means is peculiarly efficacious for the reason that the pin picks up the wheel with an easy accelerating motion and then slows it down and finally brings it fully to rest before the locking rib enters the slot in the star-wheel. Thus there is no danger that the star-wheel will over-shoot under its momentum and there is no momentum arresting strain put upon the rib and slot locking connection. The action is smooth, quiet and without shock and particularly adapted for driving parts having considerable inertia.

In the accompanying drawings Fig. 1 is a side elevation of a mechanism embodying the invention. Fig. 2 is a right end elevation with the driving-pin entering into driving relation with the star-wheel. Fig. 3 is a similar view with the driving-pin emerging from driving relation with the star-wheel. Fig. 4 is a bottom plan view with the parts timed the same as in Fig. 3, and Fig. 5 is a perspective view of the collar and locking rib member.

In the preferred embodiment of the invention illustrated, 1 represents a frame casting having attaching feet 2 and transverse members 3 and 3' in the first of which is journaled an upright shaft 4 the lower end of which is formed with a head 5, in which the driving-pin 6 is fixed eccentric to the axis of the shaft 4. Journaled in the transverse frame members 3 and 3' is the shaft 7 to which is fixed the star-wheel 8 having peripheral teeth 9 interspersed with slots 10 adapted to be engaged intermittently by the driving-pin 6 which, it will be noted, is out of engagement with the star-wheel for about one-half revolution of the shaft 4. During this period of non-engagement, the star-wheel would be free to turn were some form of locking means not provided. For simplicity, it is preferred to mill a series of slots 11, equal in number to the number of teeth 9 or slots 10, in one face of the star-wheel 8, in a zone within the circle of the bases of the teeth 9, and to provide a locking-shaft 12 with a collar 13 having a segmental rib 14 timed to engage one of the slots 11 and lock the star-wheel, Fig. 3 and 4, just as the driving-pin 6 is emerging from one of the driving slots 10. The rib is of sufficient peripheral length to maintain locking engagement with the star-wheel 8 until the driving-pin enters the next driving slot 10.

The shaft 12 has fixed to it a bevel-gear 15 meshing with the bevel-gear 16 fixed to the shaft 4, whereby the shafts 12 and 4 run together in one-to-one relation. The shaft 12 is journaled in the frame member 3' and is disposed in right angles to the shafts 4 and 7, or parallel to and adjacent the milled side face of the star-wheel 8. The intermittent motion of the star-wheel 8 is transmitted to the shaft 7 from which it may be applied, as by gearing 17, to the use desired.

Having thus set forth the nature of the invention, what I claim herein is:—

In a mechanical movement, a shaft, a driving-pin on said shaft, a star-wheel having a toothed periphery engaged intermittently by said pin, a second shaft running with said first mentioned shaft, and a rib and groove locking connection between the second shaft and one side face of said star-wheel for locking the latter when the driving-pin is out of driving relation therewith, said locking connection being within the circle of the bases of the teeth of the star-wheel.

In testimony whereof, I have signed my name to this specification.

EDWARD B. ALLEN.